(12) United States Patent
Evans

(10) Patent No.: US 8,126,011 B2
(45) Date of Patent: Feb. 28, 2012

(54) APPARATUS AND METHOD FOR SENDING DATA OVER A COMMUNICATIONS NETWORK

(75) Inventor: Paul Andrew Evans, Ipswich (GB)

(73) Assignee: Shared Band Limited, Ipswich (GB)

( * ) Notice: Subject to any disclaimer, the term of this patent is extended or adjusted under 35 U.S.C. 154(b) by 456 days.

(21) Appl. No.: 10/567,734

(22) PCT Filed: Jul. 27, 2004

(86) PCT No.: PCT/GB2004/003255
§ 371 (c)(1),
(2), (4) Date: Feb. 2, 2007

(87) PCT Pub. No.: WO2005/018199
PCT Pub. Date: Feb. 24, 2005

(65) Prior Publication Data
US 2007/0206565 A1 Sep. 6, 2007

(30) Foreign Application Priority Data
Aug. 7, 2003 (GB) .................................. 0318518.8

(51) Int. Cl.
*H04J 3/24* (2006.01)
(52) U.S. Cl. ................. 370/473; 370/536; 709/203
(58) Field of Classification Search .......... 370/351, 370/389, 392, 464, 465, 473; 455/403
See application file for complete search history.

(56) References Cited

U.S. PATENT DOCUMENTS

| | | | |
|---|---|---|---|
| 5,390,239 A | 2/1995 | Morris et al. | |
| 6,178,448 B1 * | 1/2001 | Gray et al. | 709/224 |
| 2001/0029544 A1 | 10/2001 | Cousins | |
| 2002/0010866 A1 | 1/2002 | McCullough et al. | |
| 2002/0114332 A1 | 8/2002 | Apostolopoulos | |
| 2002/0152414 A1 * | 10/2002 | Barron et al. | 714/4 |
| 2003/0031180 A1 * | 2/2003 | Datta et al. | 370/392 |
| 2003/0043773 A1 | 3/2003 | Chang | |
| 2003/0081582 A1 | 5/2003 | Jain et al. | |
| 2003/0174714 A1 * | 9/2003 | Manik et al. | 370/396 |
| 2004/0224694 A1 * | 11/2004 | Zhao et al. | 455/445 |
| 2004/0243702 A1 * | 12/2004 | Vainio et al. | 709/224 |

FOREIGN PATENT DOCUMENTS

| | | |
|---|---|---|
| GB | 2362539 | 11/2001 |
| WO | WO 03036886 | 5/2003 |
| WO | WO 2005018199 | 2/2005 |

OTHER PUBLICATIONS

International Search Report in corresponding application WO2005/018199.
International Preliminary Report on Patentability in International Application No. PCT/GB2004/003255.
UK Patent Search for Application No. GB0318518.8, UK Patent Office, Oct. 7, 2003.
European Patent Search for Application No. EP04743582.1, EPO, Oct. 26, 2007.

* cited by examiner

*Primary Examiner* — Seema S Rao
*Assistant Examiner* — Khoa Huynh
(74) *Attorney, Agent, or Firm* — Bourque and Associates, PA

(57) ABSTRACT

The present invention provides a communication network in which data can be routed from a terminal to a WAN over a plurality of communication links, the communication links connecting a plurality of terminals to the WAN and all of the terminals being interconnected by a LAN.

9 Claims, 2 Drawing Sheets

APPARATUS AND METHOD FOR SENDING DATA OVER A COMMUNICATIONS NETWORK

TECHNICAL FIELD

The invention relates to communications networks in which a local area network (LAN) is connected to a wide area network (WAN), via a plurality of communications links.

BACKGROUND INFORMATION

For domestic users it is conventional to access the Internet and the World Wide Web using dial-up connections over telephony links. There is an increase in the use of broadband connections, which are either provided over cable TV networks or by DSL over the PSTN. However, there are some communities for which it is not possible to provide with broadband connections, either because they are too far from a CATV network or a PSTN exchange or because there are insufficient numbers to make a broadband installation economic for the network operator.

SUMMARY

According to a first aspect of the present invention there is provided a method of sending data over a communications network, the method comprising the steps of an originating terminal generating a request for a content server; the originating terminal dividing the request into a plurality of packets; the originating terminal distributing the plurality of packets to a first plurality of terminals over a first network; the first plurality of terminals transmitting packets received during step to a reconstitution server located in a second network, the first plurality of terminals being connected to the second network by a second plurality of connections; the reconstitution server receiving the plurality of packets and sending the request to the content server. Additionally, the content server sending a plurality of content data packets to the reconstitution server in response to the request received previously; the reconstitution server distributing the plurality of content data packets to the first plurality of terminals over the second plurality of connections; the first plurality of terminals sending the plurality of content data packets to the originating terminal; and the originating terminal receiving the plurality of content data packets to re-create the content data.

Preferably the plurality of packets are distributed to the first plurality of terminals in a round-robin basis. It is further preferred that the round-robin distribution of the plurality of packets is weighted and that the round-robin weighting is determined in accordance with the bandwidth of the connection between the terminal and the second network.

According to a second aspect of the present invention there is provided a communications network comprising; a first plurality of terminals, the terminals being connected by a first network and having a second plurality of connections to a second network, the second network comprising a reconstitution server and a plurality of content servers, wherein, in use, an originating terminal generates a request for one of the content servers, divides the request into a plurality of packets and distributes the plurality of packets between the first plurality of terminals via the first network, the plurality of packets are sent to the reconstitution server via the second plurality of connections, the reconstitution server sending the plurality of packets to the content server. Furthermore, the content server sends content data to the reconstitution server, the reconstitution server divides the content data into a plurality of content data packets and distributes the plurality of content data packets between the first plurality of terminals over the second plurality of connections, the first plurality of terminals distributing the plurality of content data packets to the originating terminal; the originating terminal receiving the plurality of content data packets and re-creating the content data.

The first plurality of terminals may be greater than the second plurality of connections or the first plurality of terminals may be less than the second plurality of connections. Each of the first plurality of terminals may comprise a list identifying the other active terminals. Each active terminal may periodically send a first status message to the other terminals to indicate that it is active.

Furthermore, an active terminal may send a second status message to the other terminals prior to becoming inactive.

According to a third aspect of the present invention there is provided a reconstitution server, the server, in use, receiving a plurality of packets from a first plurality of terminals, and sending the request to a content server identified by a request. Preferably, the server, in use, receives a plurality of content data packets from a content server in response to the request and distributes the plurality of content data packets between the first plurality of terminals. The reconstitution server may be in communication with the first plurality of terminals via a second plurality of connections.

BRIEF DESCRIPTION OF THE DRAWINGS

A preferred embodiment of the invention will now be described by way of illustration only and with respect to the accompanying drawings, in which.

DETAILED DESCRIPTION OF THE PREFERRED EMBODIMENTS

Figure 1:
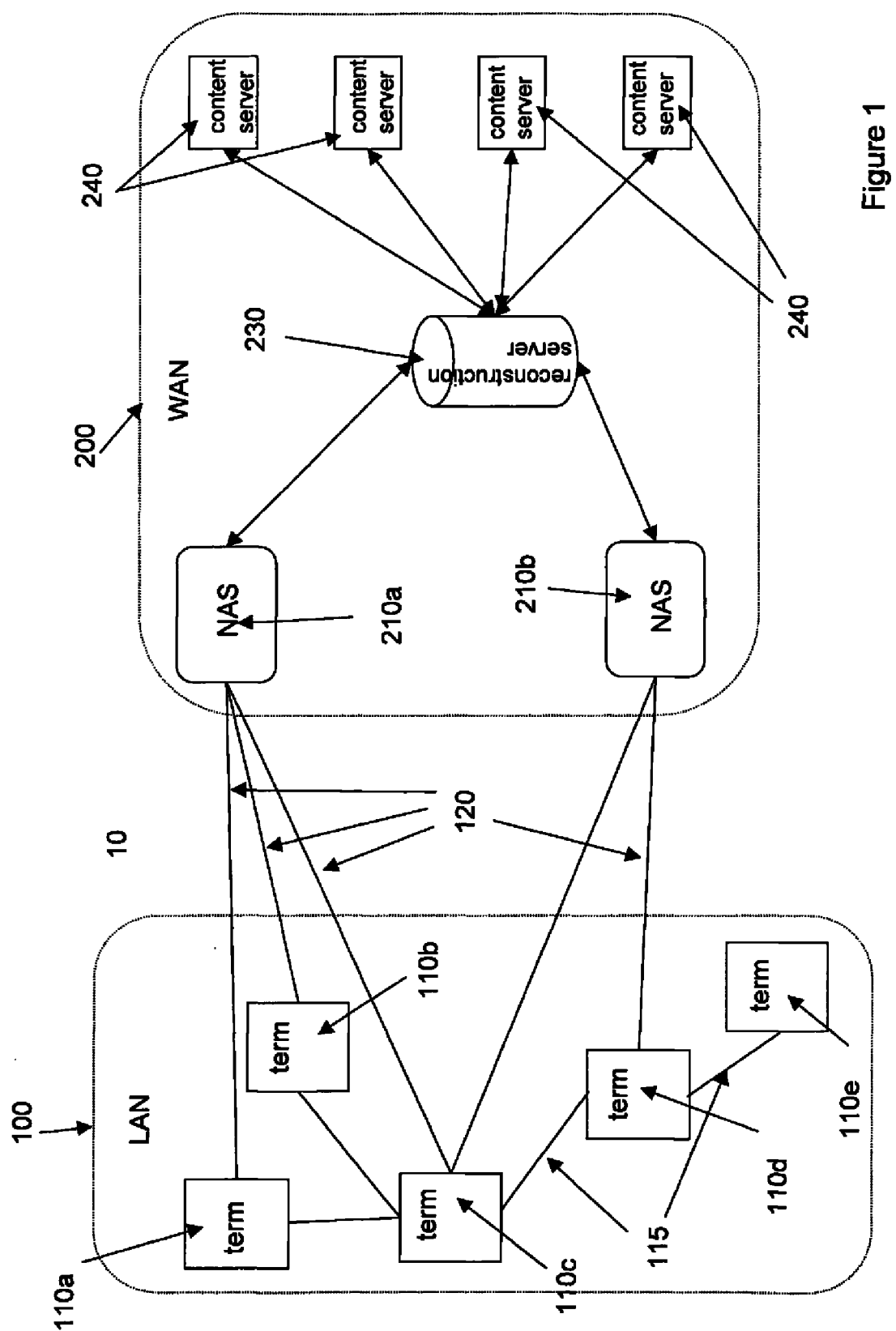
FIG. 1 shows a schematic depiction of a communications network according to the present invention.

FIG. 1 shows a schematic depiction of a communications network according to the present invention, comprising LAN 100 and WAN 200. The LAN 100 comprises a plurality of LAN terminals 110a, 110b, 110c, . . . each of which are connected to one or more of terminals 110 by LAN connections 115.

Furthermore, the LAN comprises one or more WAN connections 120 that connect a LAN terminal to the WAN 200. The WAN 200 comprises one or more network access servers (NAS) 210a, 210b, reconstitution server 230 and a plurality of content servers 240. LAN terminal 110c has a WAN connection 120 to both NAS 210a and 210b, whilst LAN terminal 110e has no WAN connection 120 and only a LAN connection 115.

In operation, a LAN terminal 110 may communicate with one of the content servers using a plurality of the WAN connections, so as to provide increased bandwidth for the communication.

Conventionally, the request to access a data resource stored on a content server comprises a number of packets and these packets are transmitted to the content server using the WAN connection associated with the terminal.

Using a method according to the present invention, terminal 110a distributes the request packets amongst the other LAN terminals, with the LAN terminals transmitting the request packets to the WAN via the WAN connections. The request packets are numbered sequentially and are routed, via the NAS 210 to the reconstitution server 230, where the request packets are sent to the appropriate content server 240.

In response, the content server delivers the requested data resource in the form of a plurality of data resource packets to the reconstitution server. The data resource packets are then transmitted to the plurality of LAN terminals, via the respective NAS; using the plurality of WAN connections.

When the data resource packets are received by the LAN terminals the packets are forwarded to the LAN terminal that initially requested the data where the data resource packets can be re-assembled in the correct order and the data resource accessed by the terminal. Thus, the present invention enables a LAN terminal to aggregate the plurality of WAN connections in order to provide a virtual connection having an increased bandwidth.

It is preferred that the LAN terminals are connected via the LAN using the Internet Protocol. Any LAN transport medium may be used, including standard Ethernet cables, wireless LAN technology (such as 802. 11b/g or Bluetooth), IP over electricity lines, etc. It is also preferred that each LAN terminal has an active WAN link in addition to a LAN interface (it is possible to have one or more LAN terminals which do not have a WAN connection, although this will have the effect of reducing the efficiency of the present invention as the ratio of LAN terminals to WAN connections will be reduced. Typically the WAN link will be a PSTN or ISDN dialup connection, with connectivity to the global Internet via any ISP. It should be understood, however, that other access technologies such as DSL, cable modems, satellite, etc. can also be shared using the method of the present invention. Typically the WAN will be the Internet, although it may be a corporate or academic WAN. The NAS will typically be operating protocols such as SLIP (Shared Line Internet Protocol) and/or PPP (Point to Point Protocol) to control the communications over the plurality of WAN connections.

The LAN terminals typically comprise a standard PC running popular client applications such as e-mail, WWW browser, media streaming, network games, etc. Additional routing software is installed onto the LAN terminals which ensure that outgoing packets are re-directed to active LAN terminals. There are various ways of accomplishing this including placing the network card into promiscuous mode, creating a default route' or a platform specific method, such as Layered Service Providers (LSP) for Microsoft Windows. In the example discussed below it will be assumed that the LSP method is used. It will be understood that the invention may also be implemented on PCs using other operating systems, such as Linux and Macintosh OS, or on other devices such as set top boxes, game consoles, etc that are capable of making network connections.

Figure 2:
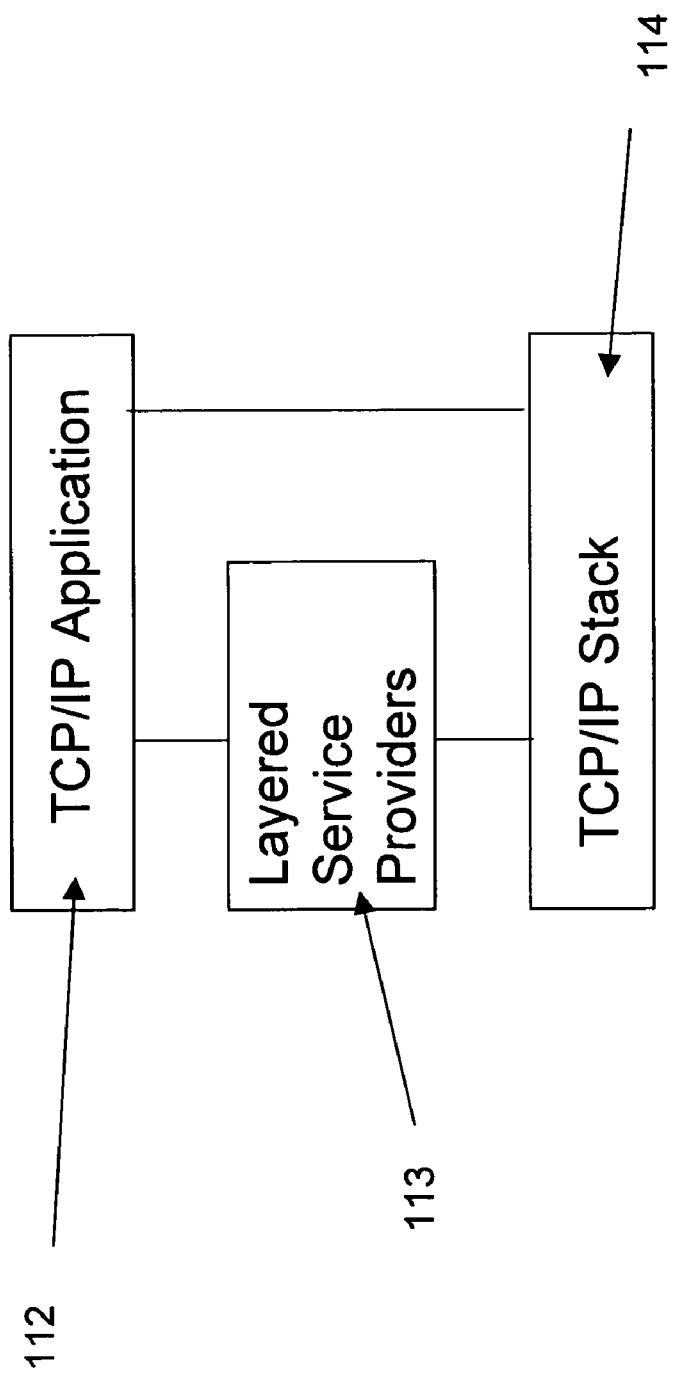
FIG. 2 shows schematic depiction of the implementation of Layered Service Providers (LSP) in a communications network according to the present invention.

FIG. 2 shows a schematic depiction of the implementation of LSP, in which LSP (Layered Service Providers) 113 is created as a dummy' layer, in between the TCP/IP application 112 and the TCP/IP stack 114. If LSP is implemented then outgoing packets are trapped: if the packet is destined for a local host, then the packet is allowed to pass unmodified to the TCP/IP stack; whilst if the packet is destined for a remote network the packet is sent to one of the LAN terminals. As the packet's destination address has now changed, the original intended destination IP address and port need to be appended to the packet's payload. It is possible to determine whether a packet is routed to a remote or local host using known methods, such as examining the LAN card's host mask.

In order for packets to be routed to LAN terminals efficiently it is necessary that each LAN terminal is aware which of the other LAN terminals are active. Each active LAN terminal notifies the other LAN terminals and the reconstitution server that they are still active by periodically transmitting an "ACTIVE" message. If a LAN terminal is to be shut down, i.e. the terminal is being switched off then a "SHUT DOWN" message will be transmitted.

In the event that a LAN terminal goes down unexpectedly e.g. power is lost, then the other LAN terminals and the reconstitution server can infer that a LAN terminal is no longer active by the failure to receive "ACTIVE" messages.

If a LAN terminal fails to transmit an "ACTIVE" message for a predetermined period of time then it will be removed from the table of active LAN terminals, which is used to determine which terminals packets may be sent to. If a LAN terminal has shut down unexpectedly and other LAN terminals are still sending packets to it then there is no way to recover this situation. To the applications generating a request packet it will appear as if there was network congestion and the packets were dropped. If the application uses a reliable transport such as TCP then lost packets will be automatically recovered.

The LAN terminals status messages may be sent using unicast (typically UDP) messages to each of the other LAN terminals, however since LANs are generally a shared media, a more efficient means of accomplishing this is by sending multicast or broadcast messages. It is preferred for the LAN terminals to send status messages to the reconstitution server using UDP or TCP. In a preferred embodiment, a LAN terminal can be inferred to be active if it is still sending packets for forwarding and thus there is no requirement for LAN terminals to send status messages if they are currently sending packets.

TABLE 1

| LAN terminal IP address | Port Number | Missed Announces | Weight |
|---|---|---|---|
| 10.0.1.3 | 7654 | 0 | 1 |
| 10.0.1.4 | 7654 | 5 | 1 |
| 10.0.1.5 | 4567 | 2 | 3 |

Table 1 shows a typical LAN terminal router list. As well as listing the IP address of active LAN terminals a port number is also advertised. This allows a single LAN terminal to run multiple instances of the router software e.g. a single computer could have 8 phone lines and modems connected to it.

LAN terminals allocate one port which other TAN terminals send packets to, and may possibly allocate a further port for packets being received from the reconstitution server.

When a LAN terminal sends requests to the other LAN terminals, the request may be sent using a simple round-robin technique. While this is simple to implement, it may not be particularly efficient if the different LAN terminals are have WAN connections that have significantly different bandwidth capacities.

According to a preferred embodiment of the present invention all LAN terminals have an associated weighting value which signifies the capacity of the WAN connection to route packets to the WAN. For example a 28.8 kbps modem might have a weighting of 1, a 56 kbps modem a weighting of 2, a dual ISDN dialup a weighting of 4, 500 kbps ADSL a weighting of 18, etc.

These weightings are used to determine the LAN terminals to which packets will be routed. For example, if LAN terminal A has a 56 kbps connection, LAN terminal B has a 28. 8 kbps connection and LAN terminal C has a 56 kbps connection and the reconstitution server wants to send a 5 packet response, it would balance the responses across the 3 LAN terminals as follows: A, B, C, A, C.

The LAN terminals may have different weightings for upstream and downstream transmissions as many access methods do not have symmetrical upstream and downstream bandwidths.

Weightings can either be set manually by a user (or the network administrator) or can be worked out automatically by monitoring the throughput associated with various upstream and downstream data transfers.

When a LAN terminal receives a packet from one of the other LAN terminals it verifies that the packet is valid, e.g. the checksums are correct, and if not the packet is dropped. If the packet is valid, the packet header is modified whereby the new source IP address and port are that of the LAN terminal's and the new destination address is that of the reconstitution server.

On LAN terminal start-up, the terminal contacts a reconstitution server in order to log onto the server (some form of terminal identification and authentication may be required). The reconstitution server will inform the LAN terminal which port it should communicate on and information is stored as an additional field in the active LAN terminal list held on the reconstitution server. The LAN terminal will use this port to communicate with the reconstitution server until the reconstitution server advises of an update.

As well as modifying the packet header, the LAN terminal needs to append the IP address of the originating LAN terminal to the packet, adding 4 additional bytes to the payload. This is in addition to the 6 payload bytes already added recording the content server IP address and port when the LSP layer forwarded the packet. The port number of the originating LAN terminal does not need to be encapsulated in the payload as the outgoing port of this packet will be set to have the same value.

When the reconstitution server receives an IP packet from a LAN terminal, it checks that the sender is authorised to use the service. It then creates a dedicated output port that is associated with the IP address and port of the originating LAN terminal. It then knows that any responses received on that dedicated port are destined for the particular IP address and port.

TABLE 2

| | |
|---|---|
| Dedicated Port | 54725 |
| Source IP | 10.0.1.1 |
| Source Port | 5173 |
| LAN identifier | 15 |
| Last used timestamp | 2135325385 |

The reconstitution server maintains a table of the dedicated output ports, and what hosts they map to (see Table 2). If an incoming dedicated port is not used for a pre-determined period, for example 5 minutes, then the port is made available again for re-use as it is assumed that there is no further traffic coming. When the port is used, that last used' timestamp is updated, where the time-stamp is stored in 32 bit UTC time format (UTC represents the number of milliseconds since 1 Jan. 1970). When a packet is received containing an IP address and port number for an originating LAN terminal that are not currently represented in the table a new port entry is made.

The reconstitution server then sends the packet to the IP address and port of the content server from the dedicated port (specifying its own IP address as the source IP address for the hop), after stripping out the 10 bytes added to the payload as they are no longer needed. When the content server responds it will send its response to the dedicated port at the reconstitution server. The reconstitution server determines which LAN the packets are destined for and performs a weighted round-robin decision to determine which of the LAN terminals the packets should be sent to. Before the packets are sent the IP address of the content server and the IP address and port numbers of the originating LAN terminal are appended to the packet payload so that the originating LAN terminal can re-create the intended packet header. The content server's port number can be inferred by setting the outgoing port number to the same—thus saving 2 bytes payload overhead.

When the LAN terminal receives a packet, it extracts and removes the originating LAN terminal IP address and content server IP address/port numbers. It then re-creates the header that the originating LAN terminal expects to see, by replacing the source/destination IP address and ports. The LSP stack on the LAN terminal will only modify outgoing packets, not incoming, and so the packet is passed to the application layer unmodified.

This system uses principles similar to IP firewalls and network/port address translation software and as such inherits some of its inherent limitations such as outgoing initiated data transfers are only allowed, and externally initiated data transfers are not generally allowed without building exception rules into the software. This prevents, for example, many peer to peer and locally hosted web services from working.

An example of packet routing is given in Appendices A-D below. A UDP client-server application called AddItUp' is assumed, in which the client sends three packets each containing a number. The server responds by echoing the negative of the number back to the client. When the server receives the third number, it adds all three numbers up and sends back a fourth packet containing the summation of the three numbers.

The LAN terminal IP address is 10.0. 1.1 and uses port 8111 for incoming and outgoing traffic for that application. The content server's IP address is 132.146. 15.101 and uses port 7111 for incoming and outgoing traffic for that application.

The LAN housing the LAN terminal has identity 15 and has been given the port 10015 on the reconstitution server for incoming traffic. The reconstitution server's IP address is 200.101. 55.1 The reconstitution server and the originating LAN terminal know that the following LAN terminals are currently active on LAN 15:

TABLE 3

| IP Address | Port | Missed Announces | Weight |
|---|---|---|---|
| 10.0.1.3 | 7654 | 0 | 1 |
| 10.0.1.4 | 4567 | 2 | 1 |

The present invention will work even if the LAN terminals use different ISPs to connect to the internet. However, if all LAN terminals use the same ISP and the ISP deploys a reconstitution server on their network, the amount of overall backbone traffic is reduced as there is less traversing of backbone networks. In addition the data flow will be more predictable, increasing the quality of some services such as media streaming, as packets routed via the networks of a number of ISPs may take radically different paths across the Internet, and this can be a cause of packet jitter.

Extensive research has shown that single user Internet connections are typically left unused 90% to 95% of the time as users. Therefore it is unlikely that there would be much local contention problem. Additional policy enforcement can easily be added to ensure a single user within the community does not use a disproportionate amount of the shared bandwidth.

With shared network connectivity it is possible for users to utilise their phone line for voice calls etc. whilst still using the Internet (via the collective connections). Normally a user has to disconnect from the Internet to use their phone line for calls. The same principles can be applied to non-IP networking technologies such as AppleTalk.

It is envisaged that the invention is suitable for use in communities in which it is not possible, for economic or technological reasons, to provide broadband services such as DSL or cable internet links. By aggregating a number of PSTN and/or ISDN links it is possible to provide users with a greater bandwidth, that with a sufficient number of users may approach or exceed that provided by DSL. The invention may also be used to aggregate broadband connections to provide a connection having further increased bandwidth. Groups of LAN terminals may be organised into a community that share a number of WAN connections. It is possible that a single LAN may comprise more than one such community of LAN terminals and that a LAN terminal may be a concurrent member of more than one community of LAN terminals.

The invention may also be implemented within offices and campuses, etc., as telephone lines can be used for data services when not being used for voice services. The use of the phone lines may replace or complement a dedicated Internet connection. ISDN would be ideal for such an application as it has a quick setup/tear down process.

APPENDIX A

Packet 1

| | |
|---|---|
| AddItUp Client Send '44' | Source: 10.0.1.1 port 8111. Destination: 132.146.15.101 port 7111 Payload: 44 |
| LSP intercepts. Sends to first LAN terminal in active list | Source: 10.0.1.1 port 8111 Destination: 10.0.1.3 port 7654 Payload: 44 (132.146.15.101, 7111) |
| LAN terminal forwards to Reconstitution server | Source: 10.0.1.3 port 8111 Destination: 200.101.55.1 port 10015 Payload: 44 (132.146.15.101, 7111, 10.0.1.1) |
| Reconstitution server allocates dedicated port for source 10.0.1.1/ 8111 | Source: 200.101.55.1 port 20001 Destination: 132.146.15.101 port 7111 Payload: 44 |
| AddItUp server echoes back the negative number. | Source: 132.146.15.101 port 7111 Destination: 200.101.55.1 port 20001 Payload: −44 |
| The reconstitution server looks up the dedicated port entry and sends the packet to the next round-robin LAN terminal on LAN 15 (which happens to be 10.0.1.4) | Source: 200.101.55.1 port 8111 Destination: 10.0.1.4 port 4567 Payload: −44 (132.146.15.101, 7111, 10.0.1.1) |
| The LAN terminal receives the packet, reconstructs the header and forwards to the originating LAN terminal. | Source: 132.146.15.101 port 7111 Destination: 10.0.1.1 port 8111 Payload: −44 |

APPENDIX B

Packet 2

| | |
|---|---|
| AddItUp Client Send '5' | Source: 10.0.1.1 port 8111 Destination: 132.146.15.101 port 7111 Payload: 5 |
| LSP intercepts. Sends to second LAN terminal in active list. | Source: 10.0.1.1 port 8111 Destination: 10.0.1.4 port 4567 Payload: 5 (132.146.15.101, 7111) |
| LAN terminal forwards to Reconstitution server | Source: 10.0.1.4 port 8111 Destination: 200.101.55.1 port 10015 Payload: 5 (132.146.15.101, 7111, 10.0.1.1) |
| Reconstitution server has already allocated dedicated port 20001 for Source 10.0.1.1/8111 | Source: 200.101.55.1 port 20001 Destination: 132.146.15.101 port 7111 Payload: 5 |
| AddItUp server echoes back the negative number | Source: 132.146.15.101 port 7111 Destination: 200.101.55.1 port 20001 Payload: −5 |
| The reconstitution server looks up the dedicated port entry and sends the packet to the next round-robin LAN terminal on LAN 15 (happens to be 10.0.1.3) | Source: 200.101.55.1 port 8111 Destination: 10.0.1.3 port 7654 Payload: −5 (132.146.15.101, 7111, 10.0.1.1) |
| The LAN terminal receives the packet, reconstructs the header and forwards to the originating LAN terminal, | Source: 132.146.15.101 port 7111 Destination: 10.0.1.1 port 8111 Payload: −5 |

APPENDIX C

Packet 3

| | |
|---|---|
| AddItUp Client. Send 18' | Source: 10.0.1.1 port 8111 Destination: 132.146.15.101 port 7111 Payload: 18 |
| LSP intercepts. Sends to next LAN terminal in active list | Source: 10.0.1.1 port 8111 Destination: 10.0.1.3 port 7654 Payload: 18 (132.146.15.101, 7111) |
| LAN terminal forwards to reconstitution server | Source: 10.0.1.3 port 8111 Destination: 200.101.55.1 port 10015 Payload: 18 (132.146.15.101, 7111, 10.0.1.1) |
| Reconstitution server has already allocated dedicated port 20001 for Source 10.0.1.1/8111 | Source: 200.101.55.1 port 20001 Destination: 132.146.15.101 port 7111 Payload: 18 |
| AddItUp server echoes back the negative number. | Source: 132.146.15.101 port 7111 Destination: 200.101.55.1 port 20001 Payload: −18 |
| The reconstitution server looks up the dedicated port entry and sends The packet to the next round-robin LAN terminal on LAN 15 (happens to be 10.0.1.4). | Source: 200.101.55.1 port 8111 Destination: 10.0.1.4 port 4567 Payload: −18 (132.146.15.101, 7111, 10.0.1.1) |
| The LAN terminal receives the packet, reconstructs the header and forwards to the originating LAN terminal. | Source: 132.146.15.101 port 7111 Destination: 10.0.1.1 port 8111 Payload: −18 |

APPENDIX D

Packet 4 (Summation Packet)

| | |
|---|---|
| AddItUp server adds up the 3 numbers (to 67) | Source: 132.146.15.101 port 7111<br>Destination: 200.101.55.1 port 20001<br>Payload: 67 |
| The reconstitution server looks up the dedicated port entry and sends the packet to the next round-robin LAN terminal on LAN 15 (happens to be 10.0.1.3 | Source: 200.101.55.1 port 8111<br>Destination: 10.0.1.3 port 7654<br>Payload: 67<br>(132.146.15.101, 7111, 10.0.1.1) |
| The LAN terminal receives the packet, reconstructs the header and forwards to the originating LAN terminal | Source: 132.146.15.101 port 7111<br>Destination: 10.0.1.1 port 8111<br>Payload: 67 |

The invention claimed is:

1. In a local area network comprising a plurality of terminals configured for running client applications and connecting to the Internet, and each of said plurality of terminals including packet routing software having the ability to control dividing a request for information from a content server issued by one of said plurality of terminals into a plurality of packets, and to distribute the plurality of packets via the local area network to others of said plurality of terminals, a method of sending data over a communications network, the method comprising the steps of:

(a) upon activation of each of said plurality of terminals, each said terminal sending a message to at least a reconstitution server to indicate that said terminal is active;

(b) generating a request for information from a content server coupled to a wide area network by an originating active terminal, said originating active terminal coupled by means of a local area network to each of said other of said plurality of active terminals;

(c) each active terminal periodically sending a first status message to the other of the plurality of terminals in the local area network and to a reconstitution server to indicate that it is active;

(d) dividing the request for information from a content server into a plurality of packets by said originating active terminal;

(e) the originating active terminal selectively distributing, under control of its packet routing software, the plurality of packets between a first plurality of active terminals in the local area network by means of a first communication path internal to and forming the local area network, each of said first plurality of active terminals having a second communication path, said second communication path comprising an associated wide area connection directly to the Internet, said associated direct wide area network connection to the Internet of a at least a first one of said first plurality of active terminals in the local area network different from an associated, direct, wide area network connection to the Internet of at least a second one of said first plurality of active terminals, the plurality of packets being distributed between active terminals over the local area network;

(f) each of said first plurality of active terminals transmitting each of said first plurality of packets received by a given active terminal during step (e) over its associated, direct, wide area connection to the Internet to said reconstitution server coupled to the Internet, such that the originating active terminal shares the bandwidth of the associated, different wide area connections to the internet of said first plurality of active terminals;

(g) the reconstitution server receiving the plurality of packets from said first plurality of active terminals in the local area network via said at least a first and second of said associated, different and direct wide area connections, reconstituting the plurality of packets into said request for information from said content server issued by said originating active terminal, and sending the reconstituted plurality of packets to the content server as said request for information;

(h) the content server sending content data to the reconstitution server in response to the request received in step (g), the data being sent as a plurality of content data packets;

(i) the reconstitution server distributing the plurality of content data packets to the first plurality of active terminals over the respective wide area connections;

(j) the first plurality of active terminals sending the plurality of content data packets to the originating terminal over said first communication path internal to and forming the local area network under control of their respective packet routing software; and (k) the originating terminal receiving the plurality of content data packets to re-create the content data.

2. The method according to claim 1, wherein in step (e) and/or step (i), the plurality of packets are distributed to the first plurality of active terminals in a round-robin basis.

3. The method according to claim 2, wherein the round-robin distribution of the plurality of packets is weighted.

4. A method according to claim 3, wherein the round-robin weighting is determined in accordance with the bandwidth of the respective wide area connection between the terminal and the Internet.

5. A communications network comprising;

a plurality of terminals configured for running client applications and for connecting to the Internet, each of the plurality of terminals including packet routing software and being connected to one another by a local area network, and at least some of said terminals having an associated, different and direct wide area connection to the Internet, said plurality of terminals each having the ability to divide a request issued by one of said plurality of terminals into a plurality of packets and to distribute the plurality of packets to other ones of said plurality of terminals via the local area network under control of its packet routing software;

a reconstitution server, coupled to the Internet and a plurality of content servers, wherein, in use, each active terminal periodically sends a first status message to the other of the plurality of active terminals in the local area network and to said reconstitution server to indicate that it is active;

wherein an originating terminal in the local area network generates a request for one of the content servers, divides the request into a plurality of packets and distributes the plurality of packets between a plurality of active terminals via the local area network;

wherein each of said plurality of active terminals sends packets received to the reconstitution server via each said at least some terminal's separate associated and direct wide area connections such that the originating terminal shares the bandwidth of the separate associated wide area connections of said at least some of said active terminals, and wherein the reconstitution server sends the plurality of packets to the content server wherein, in use, and responsive to the reconstitution server sending the plurality of packets to the content server, the content server sends content data to the reconstitution server in the form of a plurality of content data packets;

the reconstitution server distributes the plurality of content data packets between the plurality of terminals over the respective associated, different and direct wide area connections;

the plurality of terminals route the plurality of content data packets to the originating terminal; and the originating terminal receives the plurality content data packets and re-creates the content data.

6. The communications network according to claim 5, wherein one or more of said plurality of terminals has more than one respective wide area connection.

7. The communications network according to claim 5, wherein the local area network comprises one or more terminals, further to said plurality of terminals, not having a wide area connection.

8. The communications network according to claim 5, wherein each of the active terminals in the local area network comprises a list identifying the other active terminals.

9. The communications network according to claim 8, wherein an active terminal sends a second status message to the other terminals in the local area network prior to becoming inactive.

* * * * *